June 7, 1949. T. HAMILTON 2,472,475
CENTRIFUGAL AMALGAMATOR
Filed June 21, 1946

INVENTOR
Tolbert Hamilton
BY Philip A. Friedell
ATTORNEY

Patented June 7, 1949

2,472,475

UNITED STATES PATENT OFFICE 2,472,475

CENTRIFUGAL AMALGAMATOR

Tolbert Hamilton, Oakland, Calif.

Application June 21, 1946, Serial No. 678,279

7 Claims. (Cl. 209—199)

This invention relates to an improvement in methods and means for recovering gold and other precious metals from ores, sands, and even from water, and is adaptable to recovery of either coarse or fine values, even to that carried in sea water and certain streams, where the values are carried virtually in solution and are of such a degree of fineness as to defy detection by microscope.

The invention includes a centrifugal mill which can be used with or without mercury and when used with mercury in connection with gold recovery and operated at a suitable speed will provide substantially 100% recovery even including the gold which is suspended in the water. With suitable operation it can be made to separate any heavier material from a lighter material, though its principal utility exists in the separation of precious or semi-precious metals from ores, sands and water.

This invention includes a bowl which is substantially conical in form and inverted and provided with a series of concentric riffles throughout its height, and with the riffles arranged to contain mercury in the form of vertical walls and develop violent eddies to bring every particle of material and water into direct contact with the mercury, and to gradually increase the centrifugal force of the pulp as it passes upward toward the discharge rim to drive the last vestiges of values forcibly into the bodies of mercury, the bowl being spun at a speed which will effect maximum recovery, and which may vary up to even 8000 to 12,000 peripheral feet per minute in the treatment of gold-bearing water or where the sand or pulp contains the precious metals partly or wholly in an extremely finely divided form, while if the metal exists in a relatively coarse form, a speed of 1000 feet per minute or even less may be suitable.

In conventional methods of gold and other precious metals recovery, many different methods are employed, including leaching, cyanidation, flotation, gravity separation, and amalgamation. My system employs the gravitational method through centrifugal action and when necessary, includes amalgamation. In conventional gravitational and amalgamation processes, the sand, sludge or pulp flows either across a series of riffles, which in the case of fines, are loaded with mercury, and under which conditions considerable of the finest particles will wash away without ever contacting the mercury or depositing back of a riffle; and in other cases the wash is carried across amalgamated copper plates to collect the fines, but the same conditions exist in that there is no certainty of contact of the values with the mercury, and a great deal of the finest particles wash away. In my system, every particle of both mineral and water is brought forcibly in contact with the mercury with a resultant recovery of substantially 100%, including that contained in suspension or solution in the water.

The clean-up is quickly and conveniently carried out requiring only the removal of the head and inverting of the recovery mill, the riffles being so disposed that the amalgam together with an free quick-silver will flow out of the mill and the riffles therefore require no cleaning.

The objects and advantages of the invention are as follows:

First, to provide a bowl-type centrifugal amalgamator for precious metals in which the area of the mercury is increased to an area in excess of the area of the bowl under centrifugal action and which therefore will recover substantially 100% of all contained precious metals including that carried in suspension in the water.

Second, to provide an amalgamator as outlined in which rectangular pockets provide violent eddies for intimate contact of values through centrifugal force to cause a positive separation of values from a pulp.

Third, to provide an amalgamator as outlined which drives every particle of material and fluid into direct contact with the excessive area of mercury so that all amalgamable material contained in the material will be amalgamated and thereby recovered.

Fourth, to provide a centrifugal mill which will retain mercury and amalgam in the riffles irrespective of the peripheral speed of the riffle bowl or if the bowl is stationary and increase the area of the mercury over that of the bowl under centrifugal action.

Fifth, to provide a centrifugal mill as outlined which is simple in construction and arrangement, economical to operate and which operates at highest efficiency, and extremely compact and light in weight compared to its capacity.

In describing the invention reference will be made to the accompanying drawings, in which.

Figures 1, 2:
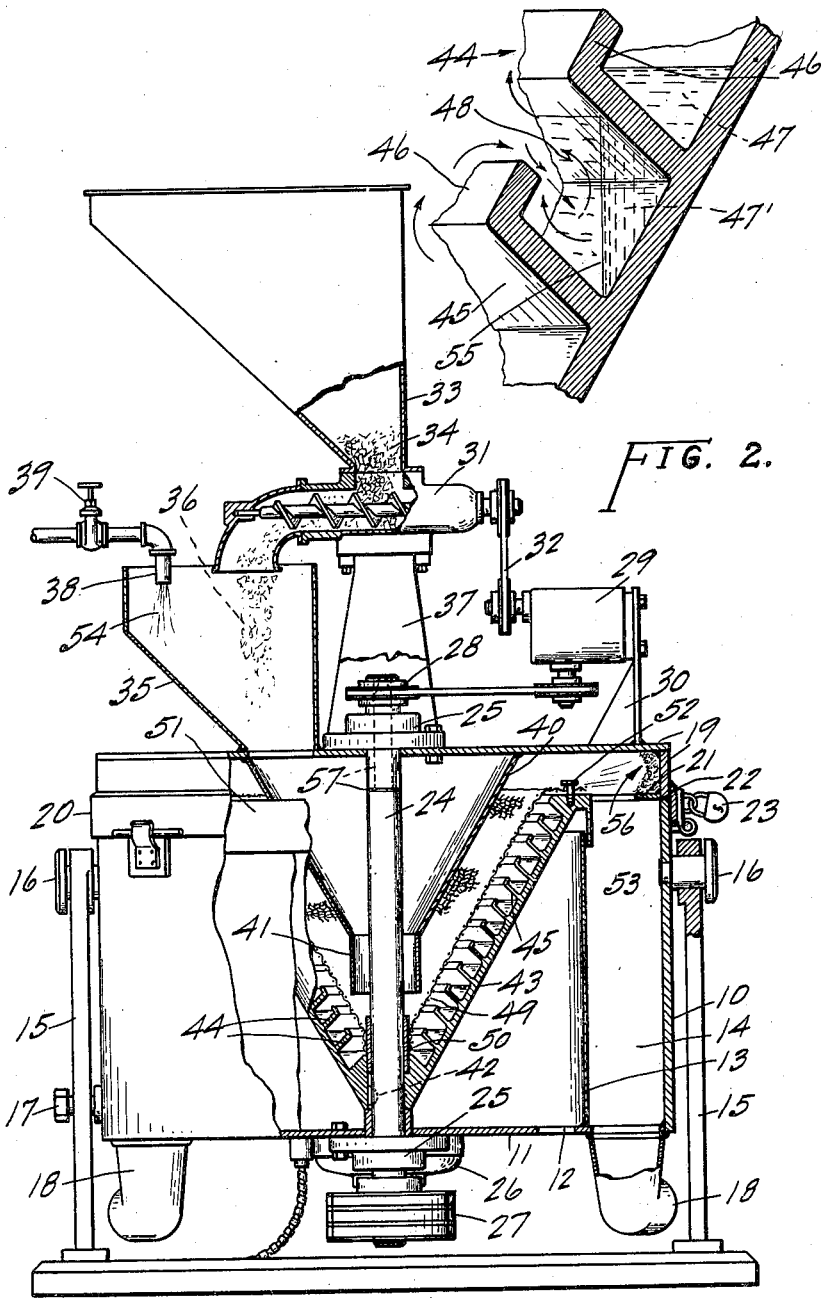
Fig. 1 is a front elevation of the invention shown partly in section.
Fig. 2 is an enlarged fragmentary view showing the riffles and the lay of the mercury or amalgam during operation and when the bowl is stationary.

The invention includes a housing 10 which is cylindrical in form and having a bottom 11 provided with a drainage opening 12, and having a concentric partition 13 to form an annular discharge space 14; this housing being supported by the standards 15 on trunnions 16 and provided with locking means 17 to keep the housing from swinging or tipping. Suitable discharge outlets 18 are provided for the discharge space.

A head 19 is removably mounted on the housing and sets on top of the housing with an annular depending flange 20 sealing the connection between the head and the housing, and an inwardly extending flange 21 prevents the discharge pulp from reaching the point of connection 22 thus preventing leakage, and locking means 23 assures non-tampering with the inside mechanism or the unauthorized removal of values of amalgam from the riffles.

Axially supported by the bottom and head is a shaft 24 which extends through both head and bottom, and is sealed at both ends by suitable packing means as indicated at 25, and which shaft is driven by a motor 26 through a pulley 27.

A drive pulley 28 is mounted on the upper end of the shaft and is operatively associated with a speed-change mechanism 29 supported by the head 19 as indicated at 30, and this speed-change mechanism drives a suitable feed mechanism such as the screw feeder 31 through a suitable drive 32, and a hopper 33 feeds material such as sand, gravel or crushed or pulverized ore 34 to the feeder which discharges into a hopper 35 as indicated at 36, the feeder 31 and hopper 33 being mounted as a unit on a pedestal 37 which is supported on the head 19, and the hopper 35 being individually supported on and opening through the head 19. A water supply 38 is provided with a control valve 39 for gauging the proportion of water added to the material 34 to form a suitable pulp.

Mounted on the underside of the head 19 and depending therefrom is an inverted cone feed chute 40 and which discharges at the lower end through a concentric passage 41.

Fixedly mounted on the shaft 24 as indicated at 42 is a spinner 43 which may vary in shape from that shown but which operates at highest efficiency when made in inverted conical form as illustrated, and which has concentric riffles 44 extending in diagonal series from the bottom to the top of the spinner, these riffles being of an inverted L-shape in cross-section with the leg 45 extending at right angles to the wall of the cone and the head 46 projecting upwardly parallel with the wall of the cone, to form a recess for mercury 47 and an eddy former under the overhanging head to create violent eddies and turbulence as indicated at 48 to bring every particle of water and material into forcible contact with the mercury and to wash out all non-amalgamable material which readily, through this turbulence washes over the upwardly inclined back wall of the riffle because of the force of the flow over the upper edge of the head 46.

Mounted inside the cone and in spaced relation from the heads of the riffles is a screen 49 which completely encloses the riffle structure, being attached at the lower end to a collar 50 which is fixed with the cone and shaft, and at the upper end being fixed on the head 51 of the spinner as indicated at 52, the head of the spinner terminating in a depending skirt 53 which encompasses the upper end of the wall 13.

For concentration of relatively heavy minerals the machine can be used without mercury in which case the heavy minerals are caught in the spaces between the riffles and retained while the lighter minerals or gangue gradually work over the riffles in series and are discharged into the space 14 for discharge through the outlets 18.

This machine is particularly designed for extracting fine gold or other amalgamable metals not only from sand and crushed ores, but even to extract gold in suspension or solution in sea water or gold-bearing streams. It is capable of extracting gold from water where the gold is detectable only through wet analysis in large volume or spectographically, and will recover gold, platinum and similar metals from sands and the like after having been passed over conventional riffles, quicksilver and amalgamated plates. This highly efficient recovery is due to the extreme centrifugal force and the eddies which force every particle of water and sludge into forcible and intimate contact with walls of mercury.

As with any mercury recovery system, ores are crushed sufficiently fine to free the valuable metals so they may combine with the mercury to form an amalgam.

With the top of the machine removed, the riffles are each supplied with mercury as indicated at 47 in Fig. 2. The top is replaced and the finely crushed ore 34 is fed slowly from the hopper 33 by the screw feed 31, into the hopper 35 as indicated at 36, at which point water 54 under control by valve 39 is admitted in suitable amount, the sludge passing down through the conical chute 40 thence through the cylindrical sleeve 41 to the bottom of the spinner, the spinner being rotated at high speed by the motor 26.

The suction created by centrifugal action draws the material through the lower portion of the screen from whence it passes upwardly between the screen and riffles from one riffle to the other, passing about the back of one riffle, thence over the head of the riffle and abruptly over the head as indicated in Fig. 2 and outwardly against the wall 55 of mercury, thence violently eddying about as indicated by the arrows and bringing every particle of the sludge in contact with the mercury for absorption of the values by the mercury by the time the sludge has passed over th entire series of riffles and out through the upper end of the screen from whence it is violently cast into the pocket 56 where a wall of the material is built up and maintained during operation to function as a liner as indicated, the excess solids and water falling into the space 14 and discharging through the spouts 18.

The screen 49 forms a pervious wall which functions to retain a predetermined flood depth over the riffles while permitting passage of sludge to the recovery space in accordance with demand, and thus limits the recovery space to free flow of sludge over the heads of the riffles.

With sea water or water from gold-bearing streams, the water is merely passed into the hopper 35 through a suitable supply pipe such as the spigot 38, and this water travels in the same way through the screen to the riffles where the violent eddies bring every particle of water in direct contact with the mercury, recovering the values contained.

The clean-up is conveniently accomplished. The entire head is removed from the machine, in the smaller sizes by manual lifting, and in larger sizes with a suitable block-and-tackle or a hoist. The machine is extremely small and light in comparison to its capacity, so that in the majority of cases the head can be lifted manually with little difficulty. To permit removal of the head at will, the shaft has a spline coupling at 57 and extending clear through the upper portion of the shaft so that the centering can be watched when the head is being replaced, the coupling being a slip fit and being readily alignable as the head is lowered by slightly rocking the pulley 27.

With the head removed, the lock member 17 is released and the lower portion of the machine is inverted about its trunnions 16, the amalgam and free mercury merely rolling over the backs 45 of the riffles through the screen, and into a suitable receptacle (not shown) properly placed to catch the amalgam and mercury. Following the clean-up, the lower portion of the machine is returned to its upright position, the riffles provided with a new supply of mercury, the head replaced and locked, placing the machine in condition for another run of material.

I claim:

1. A concentrating and amalgamating mill comprising; a bowl-type spinner operating on a vertical axis and means for driving said spinner; said spinner having a series of concentric riffles extending throughout its height interiorly thereof; and an intake for the lower central portion of the spinner and means for intercepting discharge from the top of the spinner; said spinner being of inverted conical form for gradually increasing the centrifugal force as material advances upwardly toward the point of discharge; said riffles being L-shaped in cross-section with the leg of each riffle extending inwardly diagonally upward at right-angles to the inside surface of the spinner and with the head of each riffle being directed upwardly parallel to the inside surface of the spinner to form a rectangular pocket open between the top of the head and the bottom of the next superposed riffle to cause violent eddies within the spaces between the riffles, and with the diagonal arrangement of the legs of the riffles increasing the contact area of mercury in the pockets to a maximum in excess of the area of the spinner under centrifugal action.

2. A concentrating and amalgamating mill comprising; a bowl-type spinner operating on a vertical axis and means for driving said spinner; said spinner having a series of concentric riffles extending throughout its height interiorly thereof; and an intake for the lower central portion of the spinner and means for intercepting discharge from the top of the spinner; said spinner being of inverted conical form; said riffles being of inverted L-shape in cross-section with the leg of the riffle extending inwardly at right-angles from the inside surface of the spinner and with the head of the riffle being directed upwardly parallel to the inside surface of the spinner to form a front wall to cause violent eddies within the spaces between the riffles; a screen mounted in said spinner in spaced relation to the inner edges of the riffles to form a recovery space and a passage for material while restricting passage of material through the screen to the recovery space in accordance with demand.

3. A concentrating and amalgamating mill comprising; a bowl-type spinner operating on a vertical axis and means for driving said spinner; said spinner having a series of concentric riffles extending throughout its height interiorly thereof; and an intake for the lower central portion of the spinner and means for intercepting discharge from the top of the spinner; said spinner being of inverted conical form for gradually increasing the centrifugal force as material advances upwardly toward the point of discharge; said riffles being L-shaped in cross-section with the leg of the riffle extending inwardly at right-angles to the inside surface of the spinner and with the head of the riffle being directed upwardly parallel to the inside surface to form a wall to cause violent eddies within the spaces between the riffles; a screen mounted in said spinner in spaced relation to the inner edges of the riffles to form a recovery space and a passage for material while restricting passage of material through the screen to the recovery space in accordance with demand.

4. A concentrating and amalgamating machine comprising; a cylindrical housing having side walls and a bottom, and a concentric partition formed interiorly thereof; a shaft axially mounted in said housing and means for driving said shaft; a spinner of inverted conical form and axially mounted on said shaft and having a series of spaced riffles extending throughout its height; means for feeding material to the lower end of said spinner with the upper end of said spinner discharging waste material into the space between said side walls and said concentric partition; said riffles being of inverted L-shape in cross-section with the leg of the riffle extending inwardly diagonally upward and with the front of the riffle terminating in an upstanding wall to form a partial enclosure to cause violent eddies within the enclosures; a screen of inverted conical form mounted within said spinner and in spaced relation to the inner edges of the riffles to form a recovery space and passage for material from one riffle to the next while restricting replenishing of material to fill the space in accordance with demand.

5. A concentrating and amalgamating machine comprising; a cylindrical housing having side walls and a bottom, and a concentric partition formed interiorly thereof; a shaft axially mounted in said housing and means for driving said shaft; a spinner of inverted conical form and axially mounted on said shaft and having a series of spaced riffles extending throughout its height; means for feeding material to the lower end of said spinner with the upper end of said spinner discharging waste material into the space between said side walls and said concentric partition; said riffles being of inverted L-shape in cross-section with the leg of the riffle extending inwardly diagonally upward and with the front of the riffle terminating in an upstanding wall to form a partial enclosure to cause violent eddies within the enclosures; said housing having trunnion supports and means for locking said housing against tipping and for freeing the housing for inversion for clean-up, at will.

6. A concentrating and amalgamating machine comprising; a cylindrical housing having side walls and a bottom, and a concentric partition formed interiorly thereof; a shaft axially mounted in said housing and means for driving said shaft; a spinner of inverted conical form and axially mounted on said shaft and having a series of spaced riffles extending throughout its height; means for feeding material to the lower end of said spinner with the upper end of said spinner discharging waste material into the space between said side walls and said concentric partition; said riffles being of inverted L-shape in cross-section with the leg of the riffle extending inwardly diagonally upward and with the front of the riffle terminating in an upstanding wall to form a partial enclosure to cause violent eddies within the enclosures; a head for said housing and means for locking said head thereto; said means for feeding being supported on said housing and having detachable driving connection with said shaft.

7. In an amalgamating mill; a spinner of inverted conical form mounted on a vertical axis, and means for driving said spinner, and a series of spaced riffles L-shaped in cross-section extending throughout the height of the spinner, with the legs of the riffles projecting inwardly at right angles to the wall of the spinner and the head projecting upwardly parallel to the wall to form pockets for mercury and for creating violent eddies for intimate association of all pulp with the mercury, and to increase the contact area of the mercury under centrifugal action to an area in excess of the area of the inside of the spinner to increase the capacity and efficiency of the spinner for a predetermined size; a screen of inverted conical form mounted within said spinner and in spaced relation to the inner edges of the riffles to form a recovery space and passage for material from one riffle to the next while restricting replenishment of material to fill the space in accordance with demand.

TOLBERT HAMILTON.

REFERENCES CITED

The following references are of record in the file of this patent:

UNITED STATES PATENTS

| Number | Name | Date |
|---|---|---|
| 1,014,849 | Richardson | Jan. 16, 1912 |
| 1,018,878 | Christensen | Feb. 27, 1912 |
| 1,708,970 | Kleinschmidt | Apr. 16, 1929 |
| 1,988,528 | Waltman | Jan. 22, 1935 |
| 2,022,926 | Schlank | Dec. 3, 1935 |
| 2,132,195 | Stirn | Oct. 4, 1938 |
| 2,147,102 | Lonergan | Feb. 14, 1939 |
| 2,184,598 | Jahn | Dec. 26, 1939 |

FOREIGN PATENTS

| Number | Country | Date |
|---|---|---|
| 8721/27 | Australia | June 12, 1928 |